(12) United States Patent
Kwiatkowski et al.

(10) Patent No.: US 11,402,478 B2
(45) Date of Patent: Aug. 2, 2022

(54) SYSTEM FOR ROUGH LOCALIZATION OF MOVEABLE COOPERATIVE TARGETS DURING LASER TRACKER BASED INDUSTRIAL OBJECT MEASUREMENT

(71) Applicant: LEICA GEOSYSTEMS AG, Heerbrugg (CH)

(72) Inventors: Tomasz Kwiatkowski, Moosleerau (CH); Thomas Lüthi, Aarau (CH); Markus Steiner, Gränichen (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 299 days.

(21) Appl. No.: 16/704,632

(22) Filed: Dec. 5, 2019

(65) Prior Publication Data

US 2020/0191929 A1 Jun. 18, 2020

(30) Foreign Application Priority Data

Dec. 18, 2018 (EP) .................................... 18213695

(51) Int. Cl.
*G01S 11/02* (2010.01)
*G01S 11/04* (2006.01)
(Continued)

(52) U.S. Cl.
CPC ............. *G01S 11/026* (2013.01); *G01S 11/04* (2013.01); *G01S 11/06* (2013.01); *G01S 17/89* (2013.01)

(58) Field of Classification Search
CPC .......... G01S 11/26; G01S 11/04; G01S 11/06; G01S 17/89
(Continued)

(56) References Cited

U.S. PATENT DOCUMENTS

2010/0128259 A1 5/2010 Bridges et al.
2010/0207738 A1* 8/2010 Bloy .................. G08B 13/2462
342/368
(Continued)

FOREIGN PATENT DOCUMENTS

CN 101750012 A 6/2010
CN 101821785 A 9/2010
(Continued)

OTHER PUBLICATIONS

European Search Report and Written Opinion dated May 31, 2019 in Application No. 18213695.
(Continued)

*Primary Examiner* — Bo Fan
(74) *Attorney, Agent, or Firm* — Maschoff Brennan (57) ABSTRACT

A system configured for rough localization of moveable cooperative targets. The system includes at least one laser tracker, having a moveable upper part connected to a base part, an optical target rough location detector automatically detecting a rough location of a cooperative target, a target fine position detector automatically detecting a fine position of a cooperative target within a fine position field of view, motors for changing an orientation of the moveable upper part, a motor controller, and a computer, a first and a second radio frequency telegram (RFT) transceiver (RFTT) anchor-module, wherein each RFTT anchor-module's position is referenced to the laser tracker, a cooperative target associated with a RFTT tag-module and each of the RFTT tag- and anchor-modules an evaluation unit configured for determining a RFT-transmission specific parameter based on the transmission of RFTs between the RFTT anchor- and tag-modules and providing said RFT-transmission specific parameter to the computer.

14 Claims, 2 Drawing Sheets

(51) Int. Cl.
*G01S 11/06* (2006.01)
*G01S 17/89* (2020.01)

(58) Field of Classification Search
USPC .............................. 348/46, 169; 342/54, 368
See application file for complete search history.

(56) References Cited

U.S. PATENT DOCUMENTS

| | | | |
|---|---|---|---|
| 2012/0057174 A1* | 3/2012 | Briggs | G01S 7/51 356/603 |
| 2012/0262550 A1* | 10/2012 | Bridges | G01S 17/89 348/46 |
| 2013/0214907 A1* | 8/2013 | Bloy | G08B 13/2462 340/10.1 |
| 2013/0229512 A1* | 9/2013 | Steffey | G01S 17/66 348/135 |
| 2014/0267776 A1* | 9/2014 | Duthu | G01S 17/89 348/169 |
| 2015/0057174 A1* | 2/2015 | Martins-Filho | G01N 21/6428 506/14 |
| 2017/0167845 A1 | 6/2017 | Lüthi | |
| 2017/0219345 A1* | 8/2017 | Török | G01C 1/04 |

FOREIGN PATENT DOCUMENTS

| | | |
|---|---|---|
| CN | 102216803 A | 10/2011 |
| CN | 103477245 A | 12/2013 |
| CN | 104406585 A | 3/2015 |
| CN | 104677280 A | 6/2015 |
| CN | 105182319 A | 12/2015 |
| CN | 107024200 A | 8/2017 |
| CN | 107037441 A | 8/2017 |
| DE | 202013104715 U1 | 1/2015 |
| WO | 2007079600 A1 | 7/2007 |

OTHER PUBLICATIONS

CN Search Report in Application No. 201911263358.2 dated Apr. 8, 2021.

* cited by examiner

SYSTEM FOR ROUGH LOCALIZATION OF MOVEABLE COOPERATIVE TARGETS DURING LASER TRACKER BASED INDUSTRIAL OBJECT MEASUREMENT

CROSS-REFERENCE TO RELATED APPLICATIONS

This application claims priority to European Patent Application No. 18213695.2, filed on Dec. 18, 2018. The foregoing patent application is herein incorporated by reference.

FIELD OF THE INVENTION

This invention relates to a system which is configured for roughly localising moveable cooperative targets during laser tracker based industrial object measurement aiding radio frequency (RF) based technology, in order to support the optical detector based rough localisation functionality of a laser tracker.

BACKGROUND TO THE INVENTION

Industrial object measurement using a laser tracker is based on localising and tracking a cooperative target which is placed on a surface of an object to be measured or on localising and tracking a cooperative target which is comprised by a measurement probe. The measurement probe also referred to as target probe can be a touch probe which is brought into contact with a surface of an object to be measured wherein after establishing contact with the surface the determination of coordinate information of the point where the touch probe touches the surface is triggered. The target probe can also be a non-contact probe. The non-contact probe sends optical distance measurement radiation to a corresponding point on the surface of an object to be measured, wherein coordinate information of the point being illuminated by the optical distance measurement radiation is determined based on a part of the measurement radiation being back reflected to the probe and based on knowing under which angle the point on the surface is illuminated.

More specifically, in related exemplary prior art applications laser trackers are used for industrial measurement, e.g. for coordinative position determination of points of a component such as a vehicle body for example in the context of an inspection or for continuous position monitoring of a moving machine part. Such laser trackers are designed for coordinative position determination of said points of a component and usually for continuous tracking of a cooperative target point. Depending on the case, a cooperative target point can be represented by a retroreflective unit (e.g. cube prism) which is targeted by an optical measurement beam generated by a beam source of the measuring device or of the measuring apparatus, in particular a laser beam. The laser beam is reflected back to the measuring apparatus in a parallel fashion, the reflected beam being detected by detection means of the apparatus. In this case, an emission direction and respectively a reception direction of the beam are ascertained, for example by means of sensors for angle measurement which are assigned to a deflection mirror or a targeting unit of the system. In addition, with the detection of the beam, a distance from the measuring apparatus to the cooperative target is ascertained, e.g. by means of time-of-flight or phase difference measurement or by means of the Fizeau principle. The position coordinates of the points of a component are determined on the basis of the emission direction and respectively the reception direction and the distance.

For distance measurement, laser trackers in the prior art comprise at least one distance measuring device, wherein the latter can be designed e.g. as an interferometer (IFM). Since such distance measuring devices can measure only relative changes in distance, in order to determine an absolute distance value so-called absolute distance measuring devices (ADM) are installed in present-day laser trackers. A combination of an absolute distance measuring device and an interferometer for determining distance is for example known from WO 2007/079600 A1.

In addition, in prior art tracker systems, an offset of the received measurement beam from a zero position is ascertained on a fine targeting sensor. By means of this measurable offset, it is possible to determine a difference in position between the center of a retroreflector and the impingement point of the laser beam on the reflector and it is possible to correct or readjust the alignment of the laser beam depending on this deviation in such a way that the offset on the fine targeting sensor is reduced, in particular is "zero", and the beam is thus aligned in the direction of the reflector center. As a result of the readjustment of the laser beam alignment, continuous target tracking of the target point can be carried out and the distance and position of the target point can be determined continuously relative to the measuring device. The readjustment can be realized in this case by means of a change in alignment of the deflection mirror provided for deflecting the laser beam, said deflection mirror being movable in a motorized manner, and/or by pivoting of the targeting unit comprising the beam-guiding laser optical unit.

Independent on the kind of target probe used the determination of coordinate information of a point on the surface of an object to be measured is based on the precise coordinate information of the cooperative target. The precise coordinate information of the cooperative target is referred to in the following as the fine position of the cooperative target. Said fine position of a cooperative target is determined based on sending distance measurement radiation emitted by a distance measurement radiation source from the laser tracker to the cooperative target where parts of the distance measurement radiation are back reflected to the laser tracker and based on determining the angles under which the distance measurement radiation is being sent towards the cooperative target. Therefore, the determination of the fine position of the cooperative target necessitates a continuous line of sight contact between the laser tracker and the cooperative target such that the cooperative target can be targeted with the corresponding radiation. For establishing and maintaining said line of sight contact the laser tracker is configured for automatically detecting the rough location of the cooperative target and based thereon for detecting the fine position of the cooperative target and for tracking the cooperative target e.g. while the target is moving.

OBJECT OF THE INVENTION

There is a desire to increase the efficiency of performing a laser tracker based industrial measurement job during which an object is measured aiding a touch trigger probe or a non-contact probe which is guided either by an operator or by an automated device.

The efficiency is directly coupled to the amount of user-input actions needed in order to initiate the measuring job and to keep the measuring job running and to the time effort associated with each user-input action.

It is therefore object of some aspects of the present invention to provide a system allowing a laser tracker based industrial measurement job to be performed more efficiently by reducing the amount and time of user-input actions needed in order to set up the job and keep the job running.

SUMMARY OF THE INVENTION

Some embodiments of the invention relate to a system configured for rough localization of moveable cooperative targets during laser tracker based industrial object measurement, comprising at least one laser tracker, having a moveable upper part being moveably connected to a base part, an optical target rough location detector configured for automatically detecting a rough location of a cooperative target within a rough location field of view, a target fine position detector configured for automatically detecting a fine position of a cooperative target and tracking a cooperative target within a fine position field of view, motors for changing an orientation of the moveable upper part, a motor controller, and a computer, a first and a second radio frequency telegram (RFT) transceiver (RFTT) anchor-module, wherein each RFTT anchor-module's position is referenced to the laser tracker, a cooperative target associated with a RFTT tag-module, and associated with each of the RFTT tag- and anchor-modules an evaluation unit configured for determining a RFT-transmission specific parameter based on the transmission of RFTs between the RFTT anchor- and tag-modules and providing said RFT-transmission specific parameter to the computer, wherein the computer is configured for determining a rough location of the cooperative target based on the RFT-transmission specific parameters determined by the evaluation units, and providing based on the determined rough location control information to the motor controller for facing the upper part of the laser tracker to the cooperative target in order to bring the cooperative target within the rough location field of view.

Thereby, a cooperative target is a target which cooperates with the optical target rough location detector and the target fine position detector such that rough location detection radiation which is emitted from a rough location detection radiation source and being reflected by the cooperative target can be detected by the optical target rough location detector and such that fine position detection radiation which is emitted from a fine position detection radiation source and being reflected by the cooperative target can be detected and tracked by the target fine position detector. E.g. such a cooperative target can be a retro-reflecting target or another type of cooperative target such as a sphere in particular a metallic or ceramic sphere or a similar target which cooperates with the optical target rough location detector and target fine position detector such that a rough location of the cooperative target can be determined and such that the cooperative target can be detected and tracked accordingly. The optical target rough location detector of the laser tracker may be based on a light-sensitive CMOS/CCD/CID pixel-sensor. Thereby the sensor may comprise an array of pixels arranged on a sensor area. The target fine position detector can be based on a light-sensitive CMOS/CCD/CID pixel-sensor as well or on a position sensitive detector (PSD) being configured for determining a deviation of a position where fine position detection radiation is detected from a detector zero position. If both the optical target rough location detector and the target fine position detector are based on a pixel-sensor they can be combined in one shared pixel-array.

Furthermore, the laser tracker's computer may comprise a wireless data transceiver module which is configured for transmitting RFT-transmission specific data e.g. the RFT-transmission specific parameters between the computer and the evaluation units of the RFTT anchor- and tag-modules. Furthermore, a RFT can be any kind of electromagnetic radio frequency signal which serves the purpose of information and/or data transmission between transceivers or from a sending transceiver to a receiving transceiver. Thereby the RFT or signal can either have a package-like character or be a continuously transmitted RFT or electromagnetic radio frequency signal.

According to an embodiment of the invention the base part of the laser tracker comprises at least one of the RFTT anchor-modules.

According to a further embodiment of the invention the laser tracker comprises at least two of the RFTT anchor-modules.

According to another embodiment of the invention at least one of the RFTT anchor-modules has a wired connection to the laser tracker's computer, wherein the associated evaluation unit provides the RFT-transmission specific parameters to the computer via the wired connection.

According to a specific embodiment of the invention the determined RFT-transmission specific parameter refers to one of the phase of the RFT, the time of flight of the RFT and the intensity of the RFT and the computer is configured for determining an angle of arrival of the RFTs based on one of the phases of the RFTs, the times of flight of the RFTs and the intensities of the RFTs, in particular based on one of a differential evaluation of the phases of the RFTs, a differential evaluation of the times of flight of the RFTs and a differential evaluation of the intensities of the RFTs.

The principle of measuring the angle of arrival might be well suited for being applied e.g. if two RFTT anchor-modules are comprised by the laser tracker.

According to a further specific embodiment of the invention the RFT-transmission specific parameter refers to the time of flight of the RFT and the evaluation units are configured for determining distances between the RFTT anchor- and tag-modules based on the times of flight of the RFTs.

According to a further specific embodiment of the invention the rough location is determined based on the distances between the RFTT anchor- and tag-modules and/or based on the angles of arrival of the RFT.

In the case where the principle of the angle of arrival measurement is used to determine the rough location the rough location may be a rough direction only. The principle of angle of arrival measurement may be based on determining differences between correspondingly determined RFT-transmission specific parameters (e.g. differences in time of flight between the received RFTs, differences in phases between the received RFTs, differences in RFT intensities between the received RFTs). Thereby no absolute distances between anchors and the tag have to be determined.

According to another embodiment of the invention the RFTT tag-module associated with the cooperative target is comprised by one of the cooperative target, a cooperative target holder, and a measurement probe comprising the cooperative target.

A measurement probe may be e.g. a touch probe, a non-contact probe or a cooperative target as such which e.g. is permanently installed on an object to be measured.

Furthermore, the measurement probe can be manually guided by an operator or automatically e.g. by a robot. In case of a touch probe the probe is brought into contact with a surface of an object to be measured, whereafter the determination of coordinate information of the point where the probe touches the surface is triggered. In case of a non-contact probe, optical distance measurement radiation is sent from the probe to a corresponding point on the surface of an object to be measured, whereby coordinate information of the point being illuminated by the optical distance measurement radiation is determined based on a part of the distance measurement radiation back reflected to the probe head and based on knowing under which angle the point on the surface is illuminated.

According to a further embodiment of the invention each of the RFTT tag- and anchor-modules comprises the associated evaluation unit.

According to a further advantageous embodiment of the invention the system comprises further RFT tag-modules each being associated with one of an automated guided vehicle (AGV), a robot, an unmanned aerial vehicle (UAV), and an operator, wherein the computer is further configured for determining a rough location of the AGV, robot, UAV and the operator based on the RFT-transmission specific parameters determined by the evaluation units, and identifying based on the rough location of the AGV, robot, UAV and operator a mutual approximation below a minimum distance between at least two of a laser tracker, an AGV, a robot, an UAV, and an operator.

According to an embodiment of the invention the system comprises at least two laser trackers, wherein the RFTT anchor-modules comprise each a near field communication (NFC) module in particular a passively powered radio frequency identification (RFID) module, and the cooperative target is associated with a further NFC-module, wherein the NFC-modules of the RFTT anchor-modules are configured for automatically detecting a nearby NFC-module being associated with the cooperative target, and providing detection information related to the detection event to the computers, wherein the computers are further configured for determining based on said detection information one of the laser trackers, which then determines the rough location of the cooperative target in order to bring the cooperative target within the rough location field of view.

According to an embodiment of the invention the NFC-module being associated with the cooperative target is comprised by one of the cooperative target, a cooperative target holder, a measurement probe comprising the cooperative target, an operator, in particular a hand-held mobile device being carried by the operator, and the RFTT tag-module being associated with the cooperative target.

According to an embodiment of the invention the system further comprises static objects being referenced to the laser tracker and a display device, wherein the computer is further configured for providing rough location information related to determined rough locations to the display device for displaying the rough locations within a virtual map comprising referenced positions of laser trackers, the RFTT anchor-modules, and the static objects being referenced to the laser trackers.

According to a further embodiment of the invention the RFTT anchor- and tag-modules comprise an inertial measurement unit (IMU), wherein the IMU is configured to provide IMU-data based on measured accelerations to the computer and wherein the computer is configured to determine the rough location of the cooperative target further based on the IMU-data.

According to an embodiment of the invention the RFT is an ultra-wide band telegram (UWBT), the RFTT anchor- and tag-modules are ultra-wide band (UWB) telegram transceiver (UWBTT) anchor- and tag-modules, the evaluation units are configured for determining a UWBT-transmission specific parameter based on the transmission of UWBTs between the UWBTT anchor- and tag-modules and providing said UWBT-transmission specific parameter to the computer, and the computer is configured for determining a rough location of the cooperative target based on the UWBT-transmission specific parameters determined by the evaluation units and providing based on the determined rough location control information to the motor controller for facing the upper part of the laser tracker to the cooperative target in order to bring the cooperative target within the rough location field of view.

BRIEF DESCRIPTION OF THE DRAWINGS

The inventive system is described below in more detail purely by way of example with the aid of concrete exemplary embodiments illustrated schematically in the drawings, further advantages of the invention also being examined. In detail.

DETAILED DESCRIPTION OF THE DRAWINGS

Figure 1A:
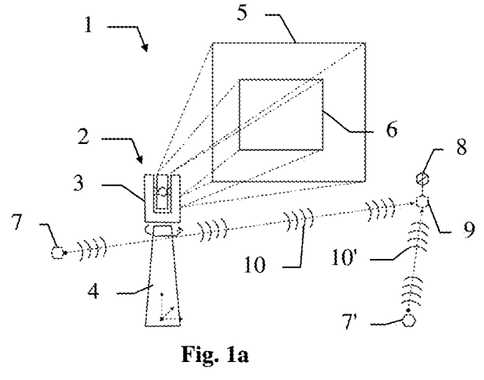
FIG. 1a shows a system according to the invention with a laser tracker, two RFTT anchor-modules and a RFTT tag-module being associated with a cooperative target.

FIG. 1a shows a system according to the invention to be used for industrial laser tracker based object measurement. The state of the art automatic target finding functionality of generic laser trackers (not shown) is a reliable feature providing a quick and convenient way to lock the fine position detection radiation, onto a cooperative target, e.g. a prism, a sphere or a similar target which reflects at least parts of the fine position detection radiation sent from the laser tracker back to the laser tracker. The cooperative target can be comprised e.g. by a cooperative target holder, a measurement probe or be fixed to the object to be measured. The functionality is based on using an optical target rough location detector and a target fine position detector each being associated with its specific field of view (FoV). Thereby, the FoV of the optical target rough location detector is larger than the FoV of the target fine position detector. Thereby the detection and tracking of a cooperative target is usually a two-step process wherein in a first step the optical target rough location detector is trying to detect the target within its larger FoV. Upon the detection of the target within the larger FoV the upper part of the laser tracker is faced to the detected rough location of the cooperative target and the target fine position detector is then capable of detecting the cooperative target within its smaller FoV and to precisely track the cooperative target. This procedure has its limits. E.g. the cooperative target must be illuminated with sufficient energy density to allow its reliable detection. This practically limits the FoV of the optical target rough location detector, within which field of view the cooperative target has to be in order for the automatic target finding functionality to perform automatic detection and tracking of the cooperative target. Furthermore, this technique requires a permanent line-of-sight contact between the cooperative target and the automatic target finding subsystem. If the cooperative target is not within the FoV of the optical target rough location detector the laser tracker is pointing in a wrong direction and cannot detect and track the cooperative target. In such a case time consuming user input is needed in order to re-face the laser tracker to the cooperative target.

Figure 1B:
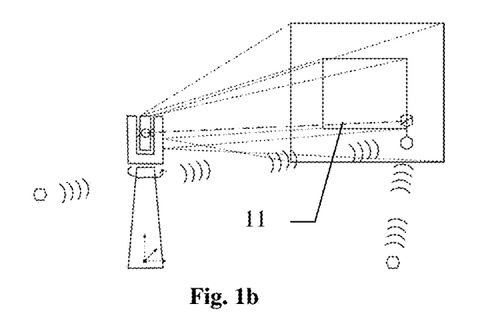
FIG. 1b shows the system of FIG. 1a with the upper part of the laser tracker facing to the cooperative target.

FIGS. 1a and 1b illustrate only schematically how the automatic target finding functionality of generic laser trackers is improved according to the inventive system (1). The system comprises a laser tracker (2) with a moveable upper part (3), a base part (4), an optical target rough location detector having a rough location field of view (5), a target fine position detector having a fine position field of view (6), two RFTT anchor-modules (7, 7') and a cooperative target (8) being associated with a RFTT tag-module (9). Associated can mean e.g. attached to the cooperative target, comprised by a cooperative target holder, comprised by a measurement probe comprising the cooperative target or being carried by an operator carrying the cooperative target, without being limited to the mentioned enumeration. In FIG. 1a, the laser tracker is not facing to the cooperative target, meaning that the cooperative target is neither within the rough location field of view nor within the fine position field of view. Without the inventive system, in such a situation, an operator would have to align the upper part of the laser tracker in order to bring the cooperative target within the rough location field of view or even within the fine position field of view. In contrast, the system (1) according to the invention allows in a situation as illustrated in FIG. 1a to automatically determine a rough location of the cooperative target, based on the RFT transmission (10, 10') between the RFTT anchor- and tag-modules, and automatically instruct the laser tracker based on the determined rough location of the cooperative target to face the upper part to the cooperative target in order to bring the cooperative target within at least the rough location field of view. Thereby, the operator does not need to take any action. As the upper part is facing to the cooperative target the automatic target finding functionality will take over the further detection and tracking of the cooperative target whereby the fine position detection radiation (11) is locked onto the cooperative target. Depending on the use case, this process can be triggered automatically or "on-demand" by a user input action (e.g. after a key stroke or pressing a button on the target probe). Referenced positions of the RFTT anchor-modules can e.g. be determined in the set-up phase using the laser tracker of the system, which is being extended by the RF-technology based localisation system.

According to a specific possible embodiment the rough location of the cooperative target may be determined based on the RFT-transmission specific parameters determined by the evaluation units and the target fine position detector may automatically detect and track the cooperative target based on the as-determined rough location of the cooperative target. Thereby, the determination of the rough location of the cooperative target based on the RFT-transmission specific parameters may be accurate enough to initiate automatic detection and tracking by the target fine position detector. Then, the determination of the cooperative target's rough location by the target rough location detector could become at least partially obsolete. If the target rough location detector would be omitted, the upper part of the laser tracker could in a first step be faced towards the rough location of the cooperative target, determined based on the RFT-transmission specific parameters, and if the cooperative target would not be detected by the target fine position detector the upper part of the laser tracker could perform a spiral movement starting at the rough location of the cooperative target and around said rough location in an outward direction until the cooperative target can be detected and tracked by the target fine position detector. Instead of a spiral movement it could be sufficient to perform a one dimensional movement, e.g. in the case where only one parameter (e.g. the azimuth angle or the angle of elevation) could not be determined accurately enough, until the cooperative target can be detected and tracked by the target fine position detector.

The determination of the rough location (can also be a rough direction only) of the cooperative target is based on the transmission of RFTs between the RFTT anchor- and tag-modules, wherein the transmission specific parameter can e.g. refer to the time of flight of the RFT or to a physical property of the RFT itself (e.g. intensity, phase) which is characteristic for a positional relationship between RFTT anchor- and tag-modules. Based thereon e.g. distances or angles between RFTT anchor- and tag-modules can be determined by techniques related to the ones known as e.g. angle of arrival measurement, multi-lateration, tri-angulation. To account for measurement errors, various algorithms such as Kalman filters can be used, which allow further improvement of system performance (in terms of accuracy and/or reaction time).

Figure 2A:
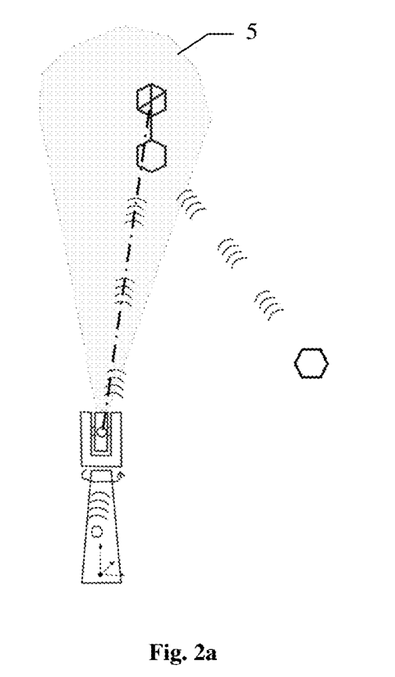
FIG. 2a shows a system according to an embodiment of the invention with one RFTT anchor-module integrated in the laser tracker's base part.
Figure 2B:
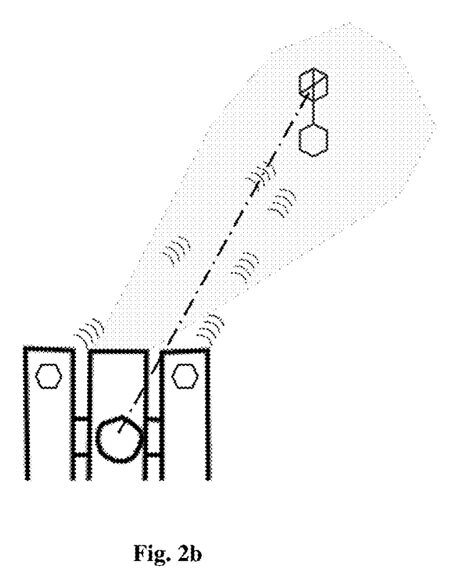
FIG. 2b shows a system according to a further embodiment of the invention with two RFTT anchor-modules being integrated in the laser tracker.

Advantageous embodiments of the invention are illustrated in FIGS. 2a and 2b. In FIG. 2a one of the RFTT anchor-modules is integrated into the base part of the laser tracker and thereby has a position referenced to the laser tracker. Having one RFTT anchor-module integrated in the base part only at least one further RFTT anchor-module with a referenced position is sufficient to determine a rough location of the cooperative target according to the invention. If a RFTT anchor-module is integrated in the laser tracker, a RFT could further be used e.g. for time synchronization or propagation of various events such as measurement triggers. In FIG. 2b two RFTT anchor-modules are integrated in the laser tracker, e.g. they can be integrated in the upper part of the laser tracker. Their position is referenced to the laser tracker. In order to enable a determination of a rough location of the cooperative target the integrated RFTT anchor-modules require a spacing between them. If two RFTT anchor-modules are integrated e.g. in the upper (rotating) part of the laser tracker (see FIG. 2b) a radial direction to the RFTT tag-module and therefore to the associated cooperative target can be estimated. The estimation is ambiguous since it cannot be distinguished between front and rear of the laser tracker. This ambiguity can be removed by implementing repeated measurements with different angles of rotation (usually this is an iterative/repetitive process as seen during target tracking) to recover the depth information, thus allowing determination of the radial direction. To circumvent missing height information a vertical search algorithm making use of the target rough location detector and its field of view could be used.

Figure 3:
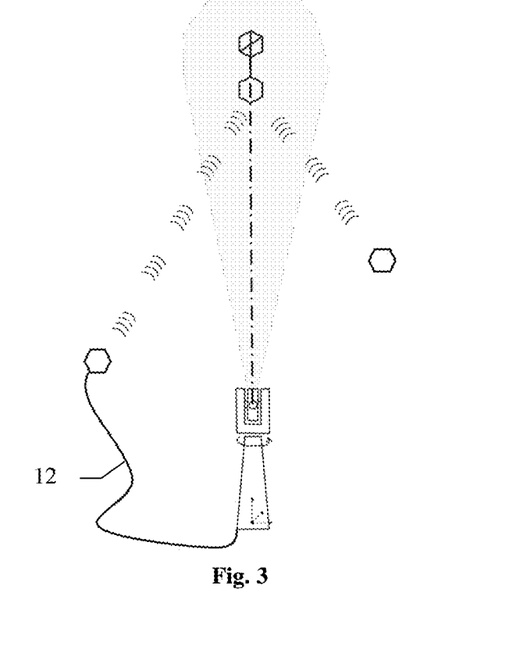
FIG. 3 shows a system according to another possible embodiment of the invention with one RFTT anchor-module having a wired connection to the laser tracker's computer.

According to a further embodiment of the invention at least one of the RFTT anchor-modules can have a wired connection (12) to the laser tracker's computer. The RFT-transmission specific parameters are then provided to the laser tracker's computer via the wired connection. According to a specific embodiment all the RFTT anchor-modules have a wired connection to the laser tracker's computer.

The rough location of the cooperative target is determined based on a RFT-transmission specific parameter. To determine such a RFT-transmission specific parameter a RFT is transmitted between the RFTT anchor- and tag-modules. E.g. by sending a RFT from a first RFTT anchor-module to the tag-module the time of flight of the RFT can be measured. Based on the measured time of flight a rough distance from the RFTT anchor- to the RFTT tag-module and thereby to the associated cooperative target can be determined. Determining a second rough distance from the second RFTT anchor-module to the RFTT tag-module and thereby to the associated cooperative target allows to determine at least a possible rough direction or a rough location of the RFTT tag-module and the associated cooperative target, wherein said rough location or direction is used to face the upper part of the laser tracker to the cooperative target in order to bring the cooperative target within the rough location field of view. Based on the time of flight measurements of the RFT, the method allows distance measurements between a RFTT tag-module and a RFTT anchor-module with a precision down to a couple of centimetres. Another possibility would be to send a RFT from each of the RFTT anchor-modules to the RFTT tag-module and use the difference between the time of flight of the RFTs according to the principle of the measurement of the angle of arrival for determining at least a rough direction or rough location of the RFTT tag-module and thereby the associated cooperative target.

According to the invention the RFTT tag-module can be comprised by the cooperative target itself, e.g. attached to it, by a cooperative target holder, e.g. a stick, or by a measurement probe comprising the cooperative target. This as well provides the necessary spatial proximity of the RFTT tag-module to the cooperative target.

Furthermore, besides the cooperative target also other objects often present at an industrial object measurement scene can be associated with further RFTT tag-modules. Such objects can e.g. be automated guided vehicles (AGVs), robots or unmanned aerial vehicles (UAVs). Not only other objects but also operators in general can be associated or have further RFTT tag-modules. Using the same principles of determining at least a rough direction to or location of the cooperative target, additionally the rough location of the AGVs, robots, UAVs and operators can be determined as well. This information can then be processed by the laser trackers computer in order to determine distances between the objects and operators present on the measurement scene. Said distance information can then be monitored in order to avoid mutual approximations below a minimum distance between the laser tracker, AGVs, robots, UAVs and operators. Thereby collisions can be avoided.

The RFTT anchor-modules can be integrated in AGVs, robots or UAVs as well. Referencing can also be achieved by e.g. steering an AGV from an initial referenced position to the desired destination. During the set-up any other device available having a RFTT anchor-module can be used for referencing e.g. such as coordinate-measuring machines, measurement arms, handheld-devices, controllers, any other battery operated or stationary third-party systems. Also in this case the laser tracker system can be used in the set-up phase to determine the referenced position of each of the RFTT anchor-modules.

Figure 4A:
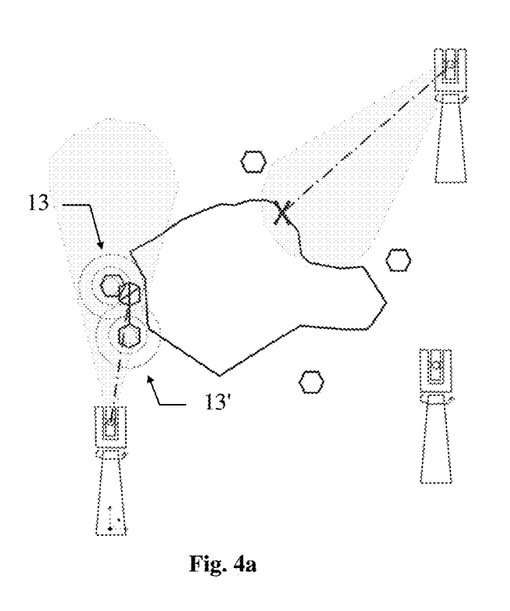
FIGS. 4a,b show a system according to a further embodiment of the invention with three laser trackers and four RFTT anchor-modules, wherein the RFTT anchor-modules have a NFC-module and the cooperative target is associated with a NFC-module.
Figure 4B:
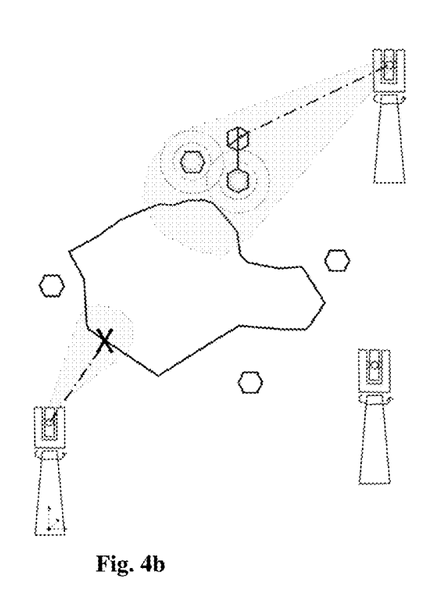

According to a further advantageous embodiment the system can comprise two laser trackers or more and each of the RFTT anchor-modules further comprises a near field communication (NFC) module (13). According to this embodiment the cooperative target is associated with a NFC-module as well (13'). Such NFC modules are typically uniquely identifiable. As the NFC modules of the RFTT anchor-modules are configured for detecting a nearby NFC-module being associated with the cooperative target and for providing detection information related to the detection event to the computers of the laser trackers, the computers can decide based on the detection information, e.g. based on the identity of the corresponding RFTT anchor-module or the identity of the NFC-module itself, which of the laser trackers is positioned best in order to target and track the cooperative target with fine location detection radiation. This can be helpful e.g. when the object to be measured obstructs the line of sight from one of the laser trackers to the cooperative target depending on the location of the point to be measured on the object. According to this embodiment the NFC-module which is associated with the cooperative target can be comprised either by the cooperative target itself, by a cooperative target holder, e.g. a stick, by a measurement probe comprising the cooperative target, by an operator who is measuring the object, e.g. the operator carries a mobile device having the NFC-module, or by the RFTT tag-module which is associated with the cooperative target.

According to a further embodiment of the invention static objects of the measurement scene and a display device can be comprised by the system. According to this embodiment the computer of the laser tracker is further configured for providing rough location information related to the determined rough locations of e.g. the cooperative targets, the AGVs, the UAVs and the operators to the display device for displaying said rough locations within a virtual map which comprises the referenced positions of the laser trackers, RFTT anchor-modules and the static objects. Thereby a supervisor can monitor the whole measurement scene and measurement job based on referenced position data and determined rough locations aiding RF based technology.

According to a further embodiment the RFTT anchor- and tag-modules can each comprise an inertial measurement unit (IMU). Each inertial measurement unit is configured for providing IMU-data related to measured accelerations in 3 directions being mainly perpendicular to each other to the computer of the laser tracker. According to this embodiment the computer is further configured for determining rough locations of RFTT tag-modules and thereby of associated cooperative targets, UAVS, AGVs, operators based on related IMU-data. The IMU-data based determination of rough locations can e.g. serve as backup solution in case the RF based technology is not operable.

According to a further specific embodiment of the invention the used RF technology refers to the ultra-wide band (UWB) technology. This means that according to this specific embodiment UWB telegrams (UWBT), UWB telegram transceiver (UWBTT) anchor- and tag-modules and UWBT-transmission specific parameters are involved in the determination of rough locations of UWBTT tag-modules and associated cooperative targets, UAVs, AGVs and operators.

As the RFTT anchor- and tag-modules have the same functionality they can be used vice-versa depending on the use-case. E.g. a RFTT anchor-module which was used during a first measurement job as RFTT anchor-module could become a RFTT tag-module during the next measurement job and vice-versa.

The RFT can comprise further information e.g. related to the identification of the RFTT anchor- and tag-modules and associated cooperative targets, UAVs, AGVs, operators and objects. Based thereon an asset management system could be implemented as well.

In the case of using UWB technology for RFT-based localisation brings among others the following advantages over conventional detection and tracking of cooperative targets with a laser tracker:
low-power consumption
functions omni-directionally and allows localisation of objects, which are not in sight e.g. due to obstructions
allows precise time-of-arrival-based localisation and real-time tracking
can work in industrial environment (a modulation algorithm can be chosen, which is well-suited for radio-frequency-sensitive environments)
can be used for communication e.g. to propagate events—no wires are required
depending on the frequency range, may be is better suited for short-distance applications in range of 30-50 meters due to its relatively high carrier frequency
short broadcast time
supports multiple RFTT tag-modules (each instance is uniquely identifiable)
symmetry (RFTT anchor- and tag-modules can share the same design)

Although the invention is illustrated above, partly with reference to some preferred embodiments, it must be understood that numerous modifications and combinations of different features of the embodiments can be made. All of these modifications lie within the scope of the appended claims.

It goes without saying that these figures illustrated are merely schematics of possible exemplary embodiments.

The invention claimed is:
1. A system configured for rough localization of moveable cooperative targets during laser tracker based industrial object measurement, the system comprising:
at least one laser tracker, having
a moveable upper part being moveably connected to a base part,
an optical target rough location detector configured for automatically detecting a rough location of a cooperative target within a rough location field of view,
a target fine position detector configured for automatically detecting a fine position of a cooperative target and tracking a cooperative target within a fine position field of view,
motors for changing an orientation of the moveable upper part,
a motor controller, and
a computer,
a first and a second radio frequency telegram (RFT) transceiver (RFTT) anchor-module, wherein each RFTT anchor-module's position is referenced to the laser tracker,
a cooperative target associated with a RFTT tag-module, and
associated with each of the RFTT tag- and anchor-modules an evaluation unit configured for determining a RFT-transmission specific parameter based on the transmission of RFTs between the RFTT anchor- and tag-modules and providing said RFT-transmission specific parameter to the computer,
wherein the computer is configured for:
determining a rough location of the cooperative target based on the RFT-transmission specific parameters determined by the evaluation units, and
providing based on the determined rough location control information to the motor controller for facing the upper part of the laser tracker to the cooperative target in order to bring the cooperative target within the rough location field of view.

2. The system according to claim 1, wherein the base part of the laser tracker comprises at least one of the RFTT anchor-modules.

3. The system according to claim 1, wherein the laser tracker comprises at least two of the RFTT anchor-modules.

4. The system according to claim 1, wherein at least one of the RFTT anchor-modules has a wired connection to the laser tracker's computer, wherein the associated evaluation unit provides the RFT-transmission specific parameters to the computer via the wired connection.

5. The system according to claim 1, wherein the determined RFT-transmission specific parameter refers to one of the phase of the RFT, the time of flight of the RFT and the intensity of the RFT and wherein the computer is configured for determining an angle of arrival of the RFTs based on one of the phases of the RFTs, the times of flight of the RFTs, and the intensities of the RFTs.

6. The system according to claim 1, wherein the RFT-transmission specific parameter refers to the time of flight of the RFT and wherein the evaluation units are configured for determining distances between the RFTT anchor- and tag-modules based on the times of flight of the RFTs.

7. The system according to claim 1, wherein the RFTT tag-module associated with the cooperative target is comprised by one of the list consisting of:
the cooperative target,
a cooperative target holder, and
a measurement probe comprising the cooperative target.

8. The system according to claim 1, wherein each of the RFTT tag- and anchor-modules comprises the associated evaluation unit.

9. The system according to claim 1, comprising additional RFTT tag-modules each being associated with one of the list consisting of:
an automated guided vehicle (AGV),
a robot,
an unmanned aerial vehicle (UAV), and
an operator,
wherein the computer is further configured for
determining a rough location of the AGV, robot, UAV and the operator based on the RFT-transmission specific parameters determined by the evaluation units, and
identifying based on the rough location of the AGV, robot, UAV and operator a mutual approximation below a minimum distance between at least two of
i. a laser tracker,
ii. an AGV,
iii. a robot,
iv. an UAV, and
v. an operator.

10. The system according to claim 1, further comprising an additional laser tracker, wherein
the RFTT anchor-modules comprise each a near field communication (NFC) module, and
the cooperative target is associated with an additional NFC-module, wherein the NFC-modules of the RFTT anchor-modules are configured for:
  automatically detecting a nearby NFC-module being associated with the cooperative target, and
  providing detection information related to the detection event to the computers,
wherein the computers are further configured for determining based on said detection information one of the laser trackers, which then determines the rough location of the cooperative target in order to bring the cooperative target within its rough location field of view.

11. The system according to claim 10, wherein the NFC-module being associated with the cooperative target is comprised by one of
  the cooperative target,
  a cooperative target holder,
  a measurement probe comprising the cooperative target,
  an operator, and
  the RFTT tag-module being associated with the cooperative target.

12. The system according to claim 1, further comprising static objects being referenced to the laser tracker and a display device, wherein the computer is further configured for providing rough location information related to determined rough locations to the display device for displaying the rough locations within a virtual map comprising referenced positions of
  laser trackers,
  the RFTT anchor-modules, and
  the static objects being referenced to the laser trackers.

13. The system according to claim 1, wherein the RFTT anchor- and tag-modules comprise an inertial measurement unit (IMU), wherein the IMU is configured to provide IMU-data based on measured accelerations to the computer and wherein the computer is configured to determine the rough location of the cooperative target further based on the IMU-data.

14. The system according to claim 1, wherein
  the RFT is an ultra-wide band telegram (UWBT),
  the RFTT anchor- and tag-modules are ultra-wide band (UWB) telegram transceiver (UWBTT) anchor- and tag-modules,
  the evaluation units are configured for determining a UWBT-transmission specific parameter based on the transmission of UWBTs between the UWBTT anchor- and tag-modules and providing said UWBT-transmission specific parameter to the computer, and
  the computer is configured for determining a rough location of the cooperative target based on the UWBT-transmission specific parameters determined by the evaluation units and providing based on the determined rough location control information to the motor controller for facing the upper part of the laser tracker to the cooperative target in order to bring the cooperative target within the rough location field of view.

* * * * *